United States Patent [19]
Thibodeau

[11] Patent Number: 5,913,385
[45] Date of Patent: Jun. 22, 1999

[54] VISUAL BRAKE STROKE INDICATOR

[75] Inventor: Gerry Thibodeau, Georgetown, Canada

[73] Assignee: Spectra Products Inc., Etobicoke, Canada

[21] Appl. No.: 08/803,425

[22] Filed: Feb. 20, 1997

[51] Int. Cl.⁶ .................................................... F16D 66/02
[52] U.S. Cl. ................................ 188/1.11; 188/1.11 W; 116/208; 116/281; 33/181 AT
[58] Field of Search ............................ 188/1.11, 1.11 W; 33/181 AT; 116/208, 281, 283, 321

[56] References Cited

U.S. PATENT DOCUMENTS

| | | |
|---|---|---|
| 3,438,351 | 4/1969 | Kirkwood . |
| 4,279,214 | 7/1981 | Thorn . |
| 4,502,233 | 3/1985 | Boitz et al. ........................ 33/181 AT |
| 4,776,438 | 10/1988 | Schandelmeier ...................... 188/1.11 |
| 4,879,964 | 11/1989 | Emerson, Jr. . |
| 4,945,818 | 8/1990 | Ware . |
| 4,991,310 | 2/1991 | Melia . |
| 5,320,198 | 6/1994 | Hoyt et al. . |
| 5,381,662 | 1/1995 | Ethen et al. . |
| 5,441,128 | 8/1995 | Hoyt . |
| 5,699,880 | 12/1997 | Hockley . |

FOREIGN PATENT DOCUMENTS 2186271  2/1997  Canada .

OTHER PUBLICATIONS

The Toronto Star, Dec. 9, 1995—"Bolt–On Gauge Ensures Safety of Truck's Brakes" Safety–Check advertisement—"The Solution To The Air Brake Adjustment Problem".

*Primary Examiner*—Charles T. Jordan
*Assistant Examiner*—Charles R. Ducker, Jr.
*Attorney, Agent, or Firm*—Eugene J.A. Gierczak

[57] ABSTRACT

An indicator for determining brake stroke condition on a vehicle braking system comprising: a bracket having an elongated member having at one end an attachment portion located generally at a right angle radius to the elongated member, the bracket mounted to a chamber mounting bracket which supports a brake chamber, the bracket chamber having a clevis assembly including a clevis pin which connects the clevis assembly to a brake arm; a continuous slot extending along the length of the elongated member, the elongated member running parallel to the clevis assembly; and a second bracket detachably mounted to the continuous slot along the elongated member the second bracket having a base and two extending members from the base; the position of the extending members being a predetermined distance from the clevis pin thereby indicative of the brake stroke condition on the vehicle braking system.

22 Claims, 5 Drawing Sheets

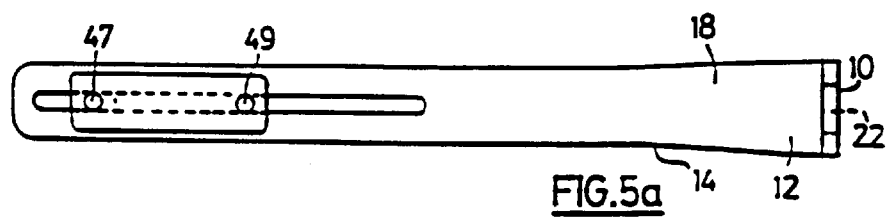
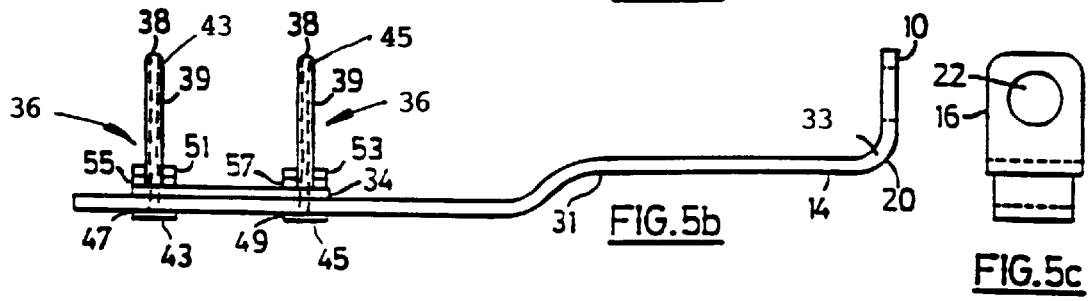
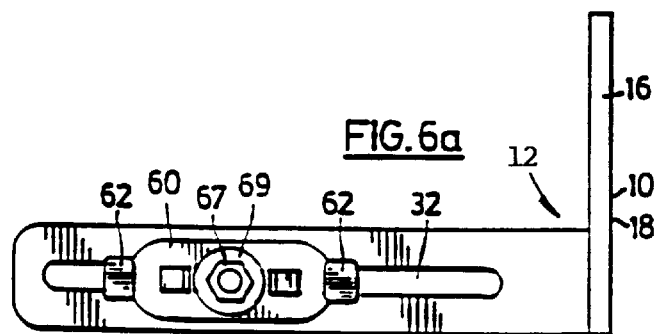
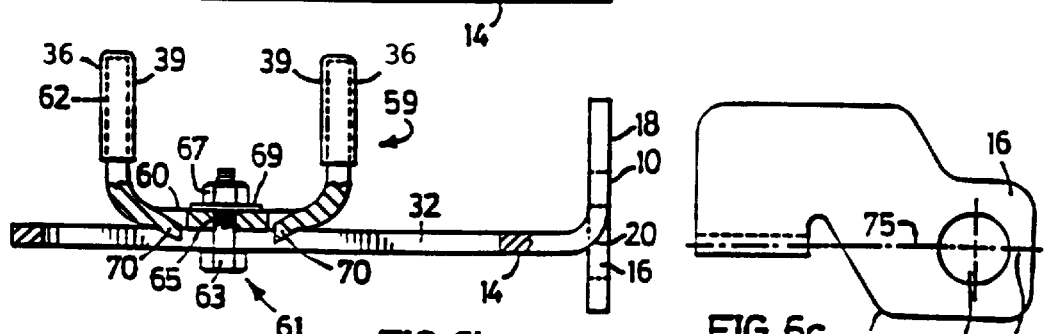

VISUAL BRAKE STROKE INDICATOR

FIELD OF INVENTION

This invention relates generally to a braking system, and in particular to a visual brake stroke indicator that may be easily installed on an air-brake chamber and can determine brake stroke condition without requiring the user to crawl under the vehicle.

BACKGROUND ART

It is generally recognized that there is a need to be able to accurately determine the brake stroke condition on a vehicle's brakes, so as to ensure the timely maintenance of the vehicles' braking system. As most braking systems are difficult to inspect for the brake stroke condition, many operators of vehicles, such as trailers and trucks, let the maintenance of the brakes lapse which can result in a loss of brake effectiveness.

Prior art adjustment indicators have been devised to address the aforenoted problems. For example, U.S. Pat. No. 4,279,214 issued Jul. 21, 1981, discloses a brake adjustment indicator which can be installed on a vehicle with pneumatic brakes. The indicator includes a sleeve that loosely fits over the push rod of a pneumatic actuator.

U.S. Pat. No. 4,776,438 issued Oct. 11, 1988, discloses a brake adjustment indicator which includes a mounting bracket having an elongated body with a slot that runs parallel to a rod that extends through an air brake chamber and connects at one end to the brake arm by a clevis pin.

U.S. Pat. No. 4,879,964 issued Nov. 14, 1989, discloses an air brake adjustment marker that includes an air supply, an air canister, and moveable members that include a push rod that extends from the air canister and has a first extended position and a second over-extended position. The adjustment marker includes a chain attached to the push rod, and an indicator flag that is activated when the push rod is in the over-extended position.

U.S. Pat. No. 5,244,061 issued Sep. 14, 1993, discloses an air brake stroke length gage that operates in conjunction with an air brake system. The gage comprises of a stroke length indicator that is mounted on the push rod, and a reference marker that is attached to the air brake system at a distance which corresponds to the appropriate stroke length for the brake system when properly adjusted.

U.S. Pat. No. 5,320,198 issued Jun. 14, 1994, discloses a indicator for indicating the setting and linear stroke movement of a brake rod of a brake assembly. The gage includes reference indicators that are located on both the brake rod's clevis and on the arm of the brake's slack adjustment member, thereby indicating the brake rod travel and the need for brake adjustment.

U.S. Pat. No. 5,441,128 issued Aug. 15, 1995, discloses a bracket body that can be attached to a brake rod and to the clevis member of a conventional brake adjustment apparatus. The bracket body provides for an indirect measurement of the brake rod travel and adjustment.

Finally, Canadian patent application 2,186,271 which was laid open on Nov. 2, 1996 shows the use of a brake adjustment indicator including a mounting bracket, having an elongated body with a slot, and a spacer for receiving two bolts for indicating limit positions.

DISCLOSURE OF INVENTION

An object of one aspect of the present invention is to provide an improved visual brake stroke indicator. A further object of this invention provides an improved visual brake stroke indicator requiring fewer parts.

In accordance with one aspect of the present invention, there is provided a visual brake stroke indicator which is mounted on a chamber mounting bracket, outside the brake chamber and includes a clevis assembly with a modified clevis pin.

In accordance with still another aspect of the invention, there is provided a visual brake stroke indicator which comprises of a bracket that includes an elongated member having at one end, an attachment portion at a right angle radius to the elongated member. The right angle radius reduces the stress on the elongated member. The elongated member may be tapered in shape, being wider at the end with the attachment portion. The elongated member also includes of a continuous slot, a spacer plate with an attachment means, and an indicating means mounted at a predetermined distance from the clevis pin.

In accordance with a further aspect of the invention, there is provided a visual brake stroke indicator which may be easily installed in a short amount of time on all types of cam operated brake systems, and is relatively inexpensive but very durable.

BRIEF DESCRIPTION OF DRAWINGS

A detailed description of the preferred embodiment is provided herein below with reference to the following drawings, in which:

FIG. 5a is a top view of the bracket of the preferred embodiment of the present invention.

FIG. 5b is a front elevational view of the bracket of the preferred embodiment of the resent invention.

FIG. 5c is a top end view of the bracket of the preferred embodiment of the present invention.

FIG. 6a is a top view of the bracket of a second preferred embodiment of the present invention.

FIG. 6b is a front elevational view of the bracket of a second preferred embodiment of the present invention.

FIG. 6c is a top end view of the bracket of a second preferred embodiment of the present invention.

Figure 1:
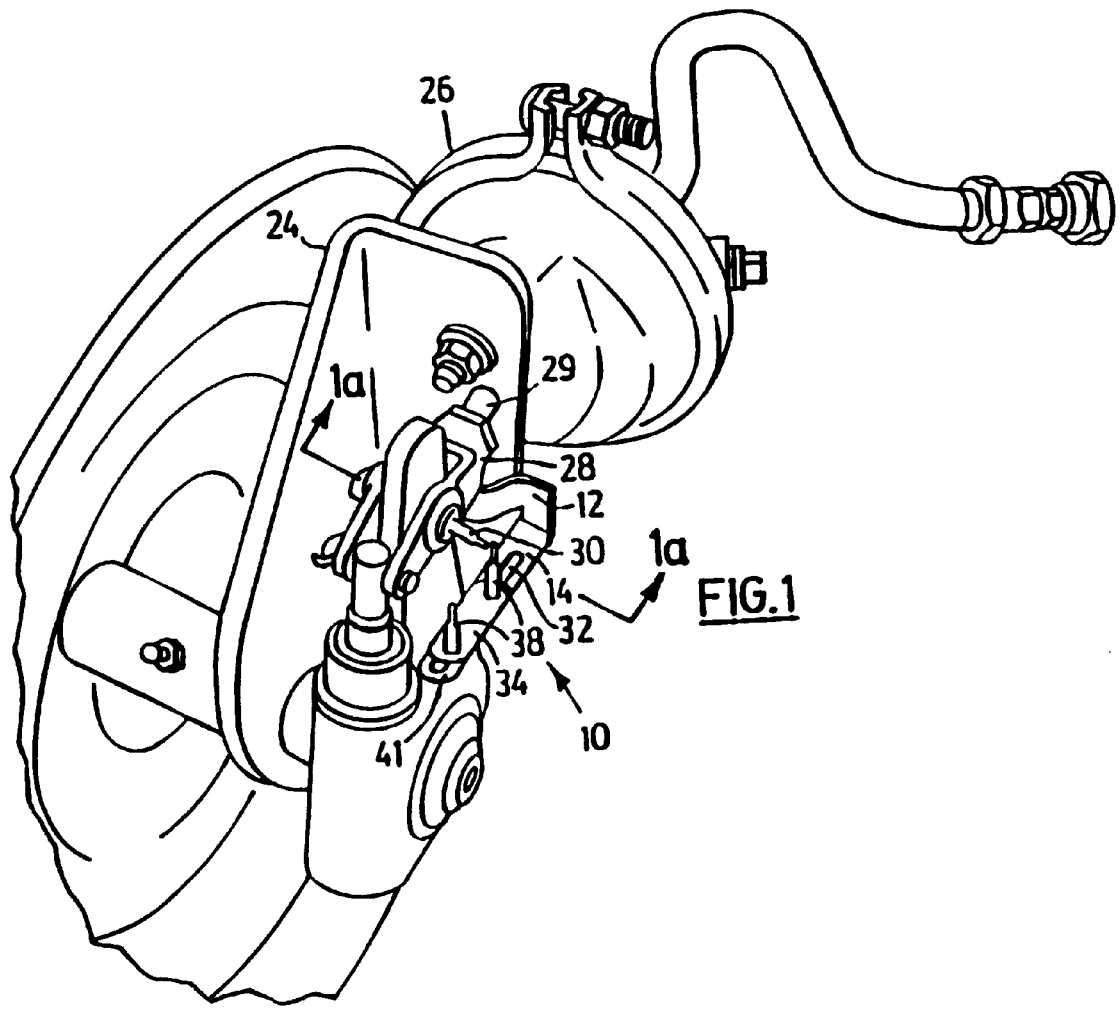
FIG. 1 is a perspective view of the visual brake stroke indicator, in accordance with the preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Referring to FIG. 1, there is illustrated in a perspective view, an indicator 10 for determining brake stroke condition on a vehicle braking system in accordance with the preferred embodiment of the present invention. The brake stroke indicator 10 for determining brake stroke condition includes a bracket 12 having an elongated member 14 that has an attachment portion 16 at one end 18. The elongated member 14 may occupy a first plane that is substantially perpendicular to a second plane occupied by the attachment portion 16.

Moreover, the attachment portion 16 is located at a right angle to the elongated member 14. A radius 20 is located between attachment portion 16 and elongated member 14. The attachment portion 16 has a hole 22 that allows the bracket 12 to be attached to a chamber mounting bracket 24 which supports a brake chamber 26. The brake chamber 26 has a clevis assembly 28 that includes a clevis pin 30 that connects the clevis assembly 28 to a brake arm 29. The elongated member 14 may run parallel to the clevis assembly 28, and may have a curve 31 at the mid-point of the elongated member so as to extend towards the clevis assembly 28 and specifically the clevis pin 30.

The elongated member 14 has a continuous slot 32 extending down the length of the elongated member 14. The continuous slot 32 may be of various lengths so as to accommodate various brake systems such as on a bus. The elongated member 14 may also be tapered in shape, generally being wider at the end 18 having the attachment portion 16 which helps to reduce the vibrational forces along the elongated member 14 during the use of the indicator 10. More specifically, since the attachment portion 16 is bolted to the chamber mounting bracket 24, the elongated member 14 is free to vibrate as the vehicle moves along the road. Therefore during use, stresses are localized along the bend 33 and eventually the bend 43 will break much like the repeated bending of metal. These stresses can be reduced by including the radius 20, reducing the amount or weight of metal from the radius 20 by tapering the elongated member 14, and including the curve 31 at the mid-point of the elongated member 14.

A spacer plate 34 may be detachably mounted to the continuous slot 32 along the elongated member 14 by indicating means which also function as an attachment means 36 to attach the spacer plate 34 to the elongated member 14. The attachment means 36 comprises two bolts or studs 43 and 45 which are thread through the continuous slot 32 of the elongated member 14 and two holes 47 and 49 of the spacer plate 34. Two nuts 51 and 53, and two locking washers 55 and 57 are provided. The bolts 43 and 45 also function as an indicating means, that is they indicate the two limit positions of acceptable brake travel. However, in the preferred embodiment the indicating means 36 may be mounted on the spacer plate 34 by the attachment means 36 at a predetermined distance from the clevis pin 30. The indicting means 36 in the preferred embodiment include yellow plastic sleeves 36 that fit over the bolts 43 and 45. The indicating means 36 define two digits 39. Moreover, since the bolts 43 and 45 fit through holes 47 and 49, the distance between the indicating means 36 (or digits 39) is set and may not accidentally move if just a continuous slot 32 were used without a spacer plate 34. The position of the indicating means 38 define the acceptable brake stroke travel between the digits 39, and thereby define the degree of wear of the brakes.

In operation, the indicator 10 for determining brake stroke condition can be used to quickly and efficiently determine the condition of the brake stroke on the vehicle. How this is achieved is explained here below with reference to FIGS. 1–4. The bracket 12 may be mounted through the attachment portion 16, on the chamber mounting bracket 24 by a bolting means 40, such as a stud 42 and nut 44. The chamber mounting bracket 24 supports the brake chamber 26 which in turn supports the clevis assembly 28. The clevis assembly 28 extends outwardly from the brake chamber 26 and the chamber mounting bracket 24, to be connected to the brake arm 29 by a clevis pin 30.

Figure 2:
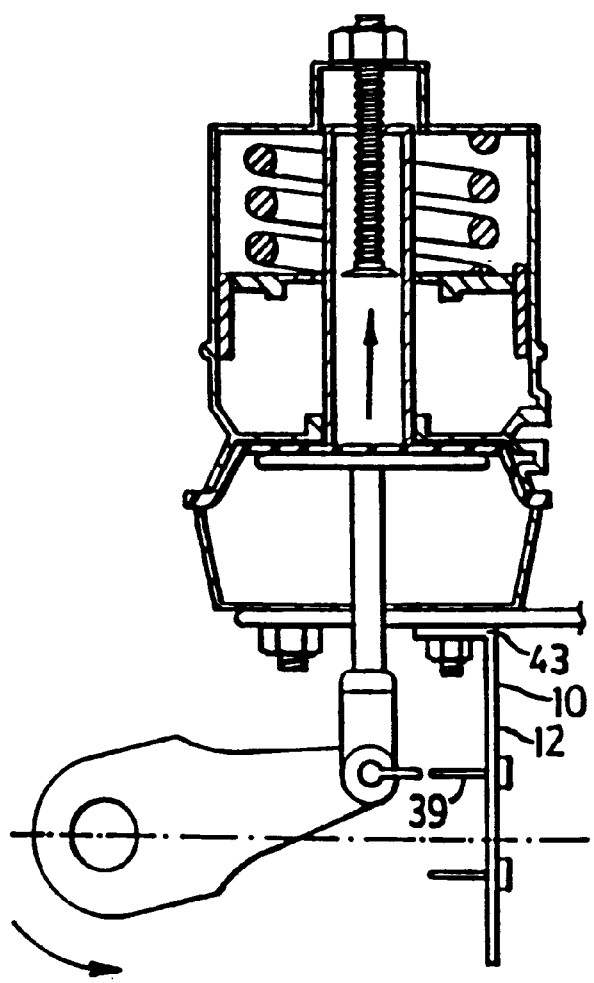
FIG. 2 is top view of the preferred embodiment in a first released position.
Figure 3:
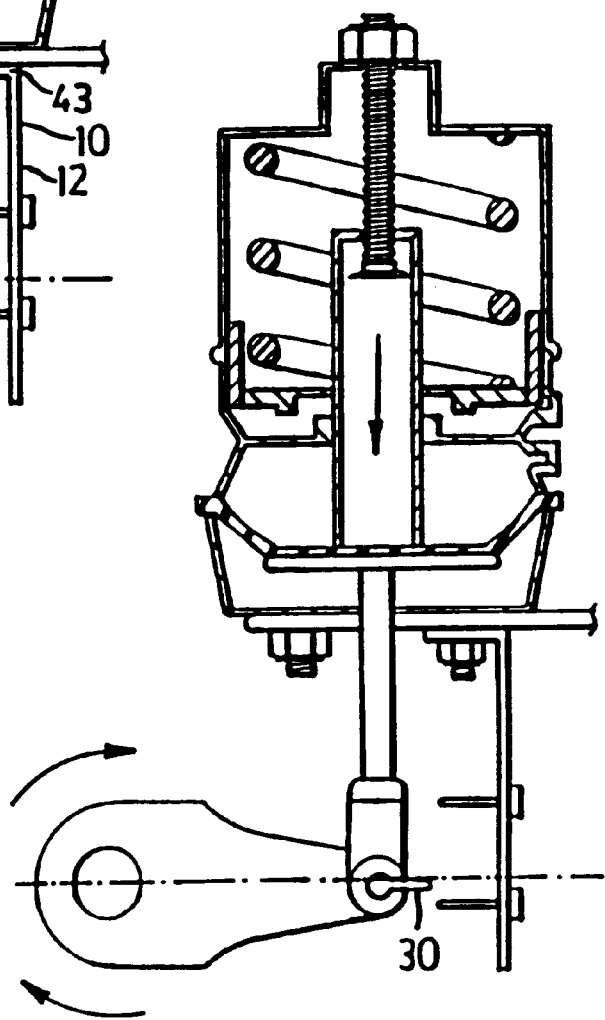
FIG. 3 is top view of the preferred embodiment in a second activated position.
Figure 4:
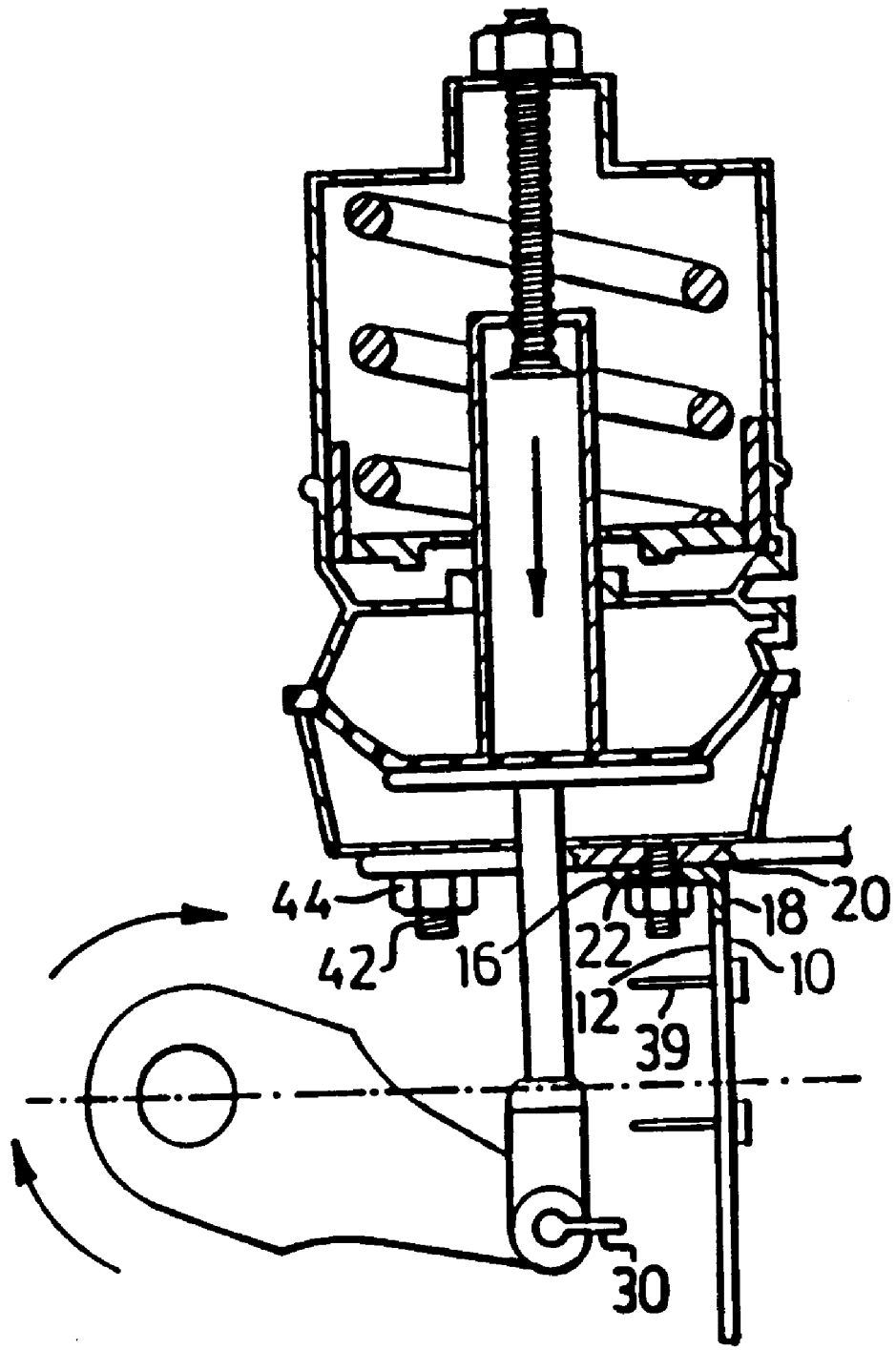
FIG. 4 is top view of the preferred embodiment in a second activated position requiring that the brakes need adjustment.

The elongated member 14 with the indicating means 36 secured to spacer plate 34, may run parallel to the clevis assembly 28 such that when the brakes are in the fully released position, the clevis pin 30 sits at a predetermined distance from the indicating means 38 or plurality of digits 39 as for example shown in FIG. 2. When the brakes of the vehicle are applied the clevis pin moves within the range of two digits 39, thereby determining that the stroke on the brakes is still at an acceptable level as shown for example in FIG. 3. When the brakes are applied and the clevis pin 30 moves beyond the range of the two digits 39, the stroke on the brakes may be determined to be unacceptable and require adjustment as shown for example in FIG. 4. The clevis pin can include a plastic sleeve 92 frictionally attached to a reduction in the diameter 90 of the clevis pin which extends beyond the larger diameter of the clevis pin 30.

SECOND PREFERRED EMBODIMENT

Referring to FIGS. 6a, 6b and 6c, there is illustrated an indicator 10 for determining brake stroke condition on a vehicle braking system in accordance with the second preferred embodiment of the present invention. The brake stroke indicator 10 for determining brake stroke condition includes a bracket 12 having an elongated member 14 that has an attachment portion 16 at one end 18. The attachment portion 16 may generally lie along a first plane which may be substantially perpendicular to the elongated member 14 which may generally lie along a second plane. A radius 20 is located between attachment portion 16 and elongated member 14. The attachment portion 16 has a hole 22 that allows the bracket 12 to be attached to a chamber mounting bracket 24 which supports a brake chamber 26. In a preferred embodiment one hole 22 is provided and the centre line 75 of second plane occupied by the elongated member 14 passes through the confines of the hole 22, and more preferably through its centre.

The indicator illustrated in FIGS. 6a, 6b and 6c may be stamped from a flat sheet of metal having the appropriate thickness. The stamped indicator would have the elongated member 14 and the attachment portion 16 in the same plane. Thereafter the stamped indicator would be bent so as to cause the elongated member to rotate or pivot relative the attachment portion by 90 degrees. In this way, the plane of the attachment portion lies generally substantially perpendicular to the elongated member 14. Furthermore, the elongated member 14 is bent so the plane of the elongated member 14 passes through the centre of hole 22. In this way one universal indicator 10 can be used on the front, back, left or right sides or the vehicle rather than using four separately configured indicators, which leads to a more complicated installation. The relationship of the plane of the elongated member 14 passing through the hole 22 permits the use of one universal indicator.

In another embodiment the bolts 43 and 45 may be replaced by single U-shaped or second bracket 59. The second bracket 59 may be detachably mounted to the continuous slot 32 along the elongated member 14 by an attachment means 61. The second bracket 59 may comprise of a base 60 and two members 62 extending vertically from the base 60. The attachment means 61 may comprise of a single bolt 63 that is thread through the continuous slot 32 of the elongated member 14 and a hole 65 and of the second bracket 59. A nut 67 and a locking washer 69 may be provided. The two vertically extending members 62 of the second bracket 59 may be mounted on the continuous slot 32 at a predetermined distance from the clevis pin 30. The two vertically extending members 62 may further comprise of yellow plastic sleeves 42 so as to define digits 39. The base 60 may further include an abutment means 70 that may prevent the second bracket 59 from rotating around the continuous slot 32. The abutment means 70 may consist of one or, as shown, two punched portions that are received into the slot 32 and bear against or abut along the sides or confines of the slot so as to prevent relative movement of the second bracket 59 and elongated member 14 once it is fastened by the bolt 63. The use of a second bracket 59 provides a simple one piece device that may be easily installed. The position of the two vertically extending members 62 to the clevis pin 30 may be indicative of the brake stroke condition on the vehicle braking system.

In summary a visual brake stroke indicator is provided with improved features for easy determination of brake stroke condition on a vehicle braking system. Furthermore, by using an attachment portion 16, which is at right angles to the elongated member 14, one indicator 10 may be used on the right side, left side or front or back of the vehicle.

Figure 1A:
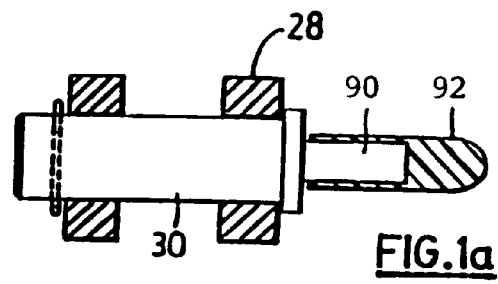
FIG. 1a is a top view of the clevis pin in accordance with the preferred embodiment of the present invention.
Figure 7A:
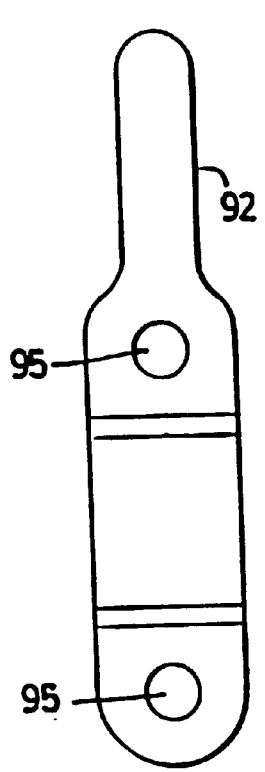
FIGS. 7a, b, c and d shown an alternate embodiment of a pointer than can be used in place of the clevis pin indicator.
Figure 7B:
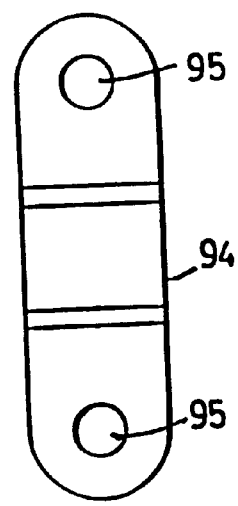
Figure 7C:
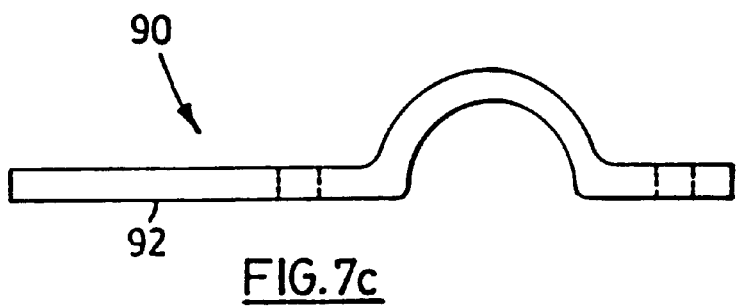
Figure 7D:

Various embodiments of the invention have now been described in detail. For example, the clevis pin indicated or shown in FIG. 1a may be replaced by a pointer 90 as shown in FIGS. 7a, b, c and d. The pointer 90 comprises of two parts 92 and 94 adapted to be clamped unto the push rod 29 but otherwise function similar to the clevis pin. The push rod 29 is adapted to be clamped between the two semicircular sections shown in Figure c and by bolts going through holes 95 (not shown) The usual clevis pin will be required to activate the braking mechanism through the push rod. A plastic sleeve similar to sleeve 42 may be added to extension 92.

Since changes in and/or additions to the above-described best mode may be made without departing from the nature, spirit or scope of the invention, the invention is not to be limited to said details.

I claim:

1. An indicator for determining brake stroke condition on a vehicle braking system comprising:
    (a) a bracket having an elongated member having at one end an attachment portion located generally at a right angle radius to said elongated member, said bracket mounted to a chamber mounting bracket which supports a brake chamber, said brake chamber having a clevis assembly including a clevis pin that connects said clevis assembly to a brake arm;
    (b) a continuous slot extending along the length of said elongated member, said elongated member running parallel to said clevis assembly;
    (c) a spacer plate detachably mounted to said continuous slot along said elongated member by an attachment means; and
    (d) an indicating means adapted to be mounted on said spacer plate by said attachment means at a predetermined distance from said clevis pin;
    (e) said attachment portion including a hole, and said elongated member defining a plane oriented so as to pass through the vicinity of the centre of said hole;
    wherein the position of said indicating means to said clevis pin being indicative of the brake stroke condition on the vehicle braking system.

2. An indicator for determining brake stroke condition on a vehicle braking system as claimed in claim 1 wherein said elongated member lies in a first plane that is substantially perpendicular to a second plane occupied by said attachment portion.

3. An indicator for determining brake stroke condition on a vehicle braking system as claimed in claim 2 wherein said hole permits said bracket to be mounted by a bolting means to said chamber mounting bracket which supports said brake chamber.

4. An indicator for determining brake stroke condition on a vehicle braking system as claimed in claim 3 wherein said bolting means further comprises a stud and a nut.

5. An indicator for determining brake stroke condition on a vehicle braking system as claimed in claim 4 wherein said indicating means includes two digit members mounted on said spacer plate through said elongated slot at a predetermined distance relative to said clevis pin.

6. An indicator for determining brake stroke condition on a vehicle braking system as claimed in claim 5 wherein said digit members have the ability to move in unison with one another relative to said clevis pin.

7. An indicator for determining brake stroke condition on a vehicle braking system as claimed in claim 1 wherein said bracket is made from mild steel and is zinc plated.

8. An indicator for determining brake stroke condition on a vehicle braking system comprising:
    (a) a bracket having an elongated member having at one end an attachment portion located generally at a right angle radius to said elongated member, wherein said elongated member has a tapered shape being generally wider at said end having said attachment portion thereby reducing vibrational forces, said bracket mountable to a chamber mounting bracket which supports a brake chamber, said brake chamber having a clevis assembly including a clevis pin that connects said clevis assembly to a brake arm;
    (b) a continuous slot extending along the length of said elongated member, said elongated member running parallel to said clevis assembly;
    (c) a spacer plate detachably mounted to said continuous slot along said elongated member by an attachment means; and
    (d) an indicating means includes two digit members mounted on said spacer plate through said elongated slot at a predetermined distance relative to said clevis pin; the position of said digit members to said clevis pin being indicative of the brake stroke condition on the vehicle braking system;
    (e) said attachment portion including a hole to permit said bracket to be mounted by a holding means to said chamber mounting bracket which supports said brake chamber;
    (f) said elongated member comprises a first plane that is substantially perpendicular to a second plane occupied by said attachment portion such that said first plane passes through the centre of said hole.

9. An indicator for determining brake stroke condition on a vehicle braking system as claimed in claim 8 wherein said digit members move in unison with one another relative to said clevis pin.

10. An indicator for determining brake stroke condition on a vehicle braking system comprising:
(a) a bracket having an elongated member having at one end an attachment portion located generally at a right angle radius to said elongated member, said bracket mounted to a chamber mounting bracket which supports a brake chamber, said brake chamber having a clevis assembly including a clevis pin that connects said clevis assembly to a brake arm;
(b) a continuous slot extending along the length of said elongated member, said elongated member running parallel to said clevis assembly; and
(c) a second bracket detachably mounted to said continuous slot along said elongated member by an attachment means, said second bracket further comprising a base and two extending members from said base;
the position of said extending members being a predetermined distance from said clevis pin, thereby being indicative of the brake stroke condition on the vehicle braking system.

11. An indicator for determining brake stroke condition on a vehicle braking system as claimed in claim 10 wherein said attachment means includes a hole to permit said second bracket to be mounted by a bolting means to said chamber mounting bracket which supports said brake chamber.

12. An indicator for determining brake stroke condition on a vehicle braking system as claimed in claim 11 wherein said bolting means further comprises a stud and nut.

13. An indicator for determining brake stroke condition on a vehicle braking system as claimed in 11 wherein said elongated member occupies a first plane that is substantially perpendicular to a second plane occupied by said attachment portion such that said first plane passes through the confines of said hole.

14. An indicator for determining brake stroke condition on a vehicle braking system as claimed in 13 wherein said base further comprises an abutment means wherein said abutment means prevents said second bracket from rotating around said continuous slot.

15. An indicator for determining brake stroke condition on a vehicle braking system as claimed in claim 13 wherein said vertically extending members move in unison with one another relative to said clevis pin.

16. An indicator as claimed in claim 8 wherein said holding means further comprises a stud and nut.

17. An indicator as claimed in claim 13 wherein said first plane passes through the confines of the centre of said hole.

18. An indicator for determining brake stroke condition on a vehicle braking system including a pressure chamber, a push rod extending longitudinally outwardly from said pressure chamber, said indicator comprising:
(a) pointing means adapted to be mounted for longitudinal movement with said push rod;
(b) a bracket having an elongated member having at one end an attachment portion with means for securement to said vehicle, with said elongated member spaced from an opposite said pointing means;
(c) a continuous slot extended along the length of said elongated member;
(d) a second bracket attachably mounted to said slot, said second bracket having a base and two extending members from said base;
wherein said position of said extending members being a predetermined distance from said pointing means, thereby being indicative of the brake stroke condition of the vehicle braking system.

19. An indictor as claimed in claim 18 wherein said pointing means comprises a clevis pin having a first diameter and a second diameter smaller than said first diameter.

20. An indicator as claimed in claim 19 further including a plastic sleeve frictionally engaged to said smaller diameter of said clevis pin.

21. An indicator as claimed in claim 18 wherein said pointing means comprises a first semi-circular section having two mounting holes therein and a second semi-circular section including two mounting holes said second semi-circular section extending outwardly to define a pointer, a bolt means passing through said holes bolting said semi-circular portions to said push rod.

22. An indicator for determining brake stroke condition on a vehicle braking system including a pressure chamber, a push rod extending longitudinally outwardly from said pressure chamber, said indicator comprising:
(a) pointing means adapted to be mounted for longitudinal movement to said push rod;
(b) a bracket having an elongated member having at one end an attachment portion with means for securement to said vehicle with said elongated member spaced from an opposite said pointing means;
(c) a continuous slot extending along the length of said elongated member;
(d) spacer plate detachably mounted to said continuous slot along said elongated member attachment means;
(e) indicating means adapted to be mounted on said spacer plate by said attachment means at a predetermined distance from said pointing means, the position of said indicating means to said pointing means being indicative of brake stroke condition on said vehicle braking system;
(f) said elongated member lying in a first plane generally at a right angle radius to said elongated member lying a second plane, wherein said elongated member has a tapered shape being generally wider at said end having said attachment portion thereby reducing vibrational forces along said elongated member, and wherein said elongated member includes a curve between its ends.

* * * * *